(12) United States Patent  (10) Patent No.: US 7,706,270 B2
Nomura et al.  (45) Date of Patent: Apr. 27, 2010

(54) COMMUNICATION CONTROL METHOD FOR RECOVERING A COMMUNICATION FAILURE DUE TO A PACKET LOOP GENERATED BY AN IMPROPER CONNECTION AND COMMUNICATION SYSTEM TO WHICH THE SAME IS APPLIED

(75) Inventors: Yuji Nomura, Kawaski (JP); Takeshi Yasuie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 872 days.

(21) Appl. No.: 11/266,176

(22) Filed: Nov. 4, 2005

(65) Prior Publication Data

US 2006/0280130 A1    Dec. 14, 2006

(30) Foreign Application Priority Data

Jun. 13, 2005  (JP) ............................. 2005-172677

(51) Int. Cl.
  *G01R 31/08*  (2006.01)
(52) U.S. Cl. ........................................ 370/233; 370/390
(58) Field of Classification Search ........................ None
  See application file for complete search history.

(56) References Cited

U.S. PATENT DOCUMENTS

| 7,383,574 | B2* | 6/2008 | Burrows et al. ................ 726/13 |
| 2001/0019552 | A1* | 9/2001 | Bharucha et al. ............. 370/386 |
| 2002/0165985 | A1* | 11/2002 | Chen et al. ................... 709/245 |
| 2002/0186694 | A1* | 12/2002 | Mahajan et al. .............. 370/390 |
| 2003/0231629 | A1* | 12/2003 | Banerjee et al. .............. 370/390 |
| 2004/0015579 | A1* | 1/2004 | Cooper et al. ................ 709/223 |
| 2005/0157723 | A1* | 7/2005 | Kim et al. .................... 370/392 |
| 2005/0169270 | A1* | 8/2005 | Mutou et al. ................. 370/390 |
| 2006/0193316 | A1* | 8/2006 | Allen ......................... 370/389 |
| 2008/0056142 | A1* | 3/2008 | Arnold et al. ................ 370/248 |

FOREIGN PATENT DOCUMENTS

JP    2002-252625    9/2005

OTHER PUBLICATIONS

Munefumi Tsurusawa; Yukio Horiuchi, Feasibility validation of management capability for an Ethernet based access network using Ethernet OAM functionality, Apr. 7, 2008, IEEE, Network Operations and Management Symposium, pp. 660-673.*

* cited by examiner

*Primary Examiner*—Jayanti K Patel
*Assistant Examiner*—Hooman Houshmand
(74) *Attorney, Agent, or Firm*—Staas & Halsey LLP (57) ABSTRACT

In a communication system, transmission/reception of data can be performed between end hosts connected to a relay switch in a subnet even in an improper connection at a L2 level in the relay switch in a communication. Communication failure due to a packet loop generated by the improper connection of the L2 level is recovered by wherein the packet loop is stopped by continuously transmitting long-size MAC packets longer than a packet generating the packet loop into the subnet, which have destinations as a broadcast MAC address or multicast MAC address.

18 Claims, 11 Drawing Sheets

COMMUNICATION CONTROL METHOD FOR RECOVERING A COMMUNICATION FAILURE DUE TO A PACKET LOOP GENERATED BY AN IMPROPER CONNECTION AND COMMUNICATION SYSTEM TO WHICH THE SAME IS APPLIED

CROSS-REFERENCE TO RELATED APPLICATIONS

This application is based upon and claims the benefit of priority from the prior Japanese Patent Application No. 2005-172677, filed on Jun. 13, 2005, the entire contents of which are incorporated herein by reference.

BACKGROUND OF THE INVENTION

1. Field of the Invention

The present invention relates to a communication control method and a communication system to which the same is applied. More particularly, the invention relates to a communication control method for ensuring communication when a L2 loop is generated and a communication system to which the same is applied.

2. Description of the Related Art

In network, a L2 loop (broadcast storm) is known as one of very frequent failures generated due to improper connections of LAN cables (see, e.g., Japanese Patent Application Laid-Open Publication No. 2002-252625). When the L2 loop is generated, not only higher loads are applied to transmission paths of an entire subnet, but also a phenomenon called a black hole is generated, which forwards packets to a place where the loop exists.

Figure 1A:
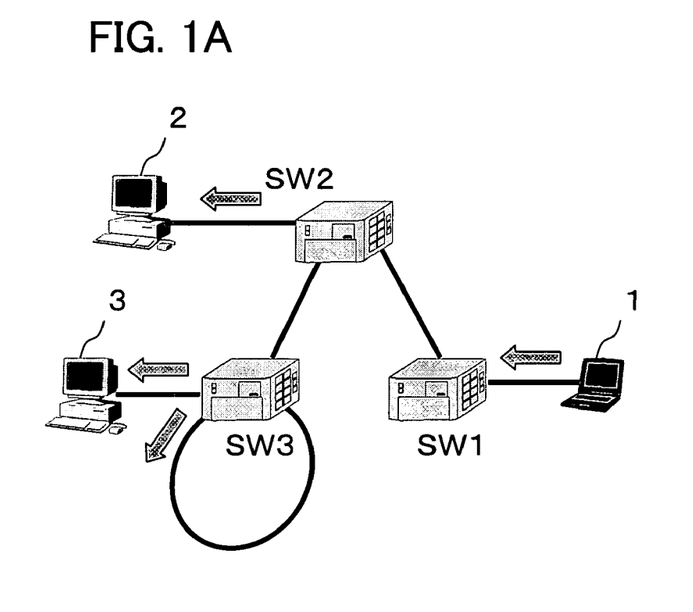
FIGS. 1A and 1B are diagrams describing a mechanism of generation of a L2 loop (broadcast storm)
Figure 1B:
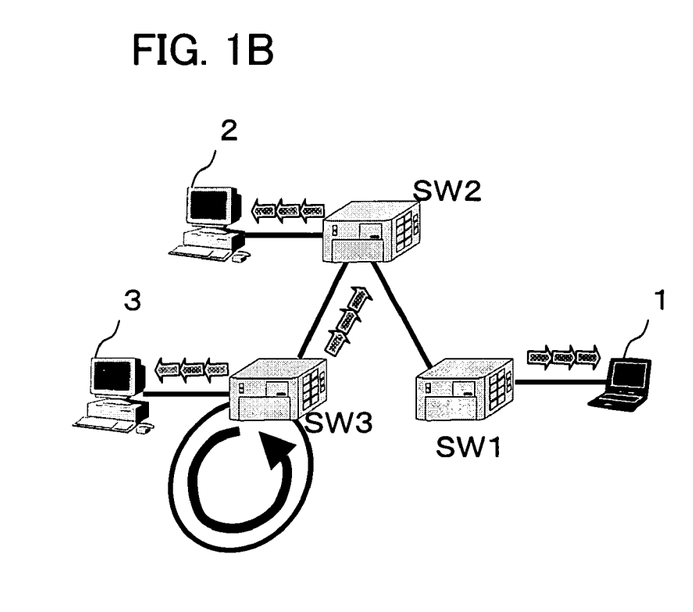

A mechanism of generation of the L2 loop can be explained as follows. FIGS. 1A and 1B are diagrams describing the mechanism of generation of the L2 loop.

As shown in FIG. 1A, at the time of normal operation, a terminal 1 transmits a broadcast packet using an own MAC address "A" as an out going address. The packet is forwarded by each relay switch SW1, SW2, SW3 such that the packet reaches to all the terminals 2, 3 in a subnet.

At this point, each relay switch SW1, SW2, SW3 learns the outgoing MAC address "A" at a port receiving the packet. In other words, each switch learns that a terminal having the MAC address "A" exists before the port. Therefore, next time another terminal transmits a packet with the destination MAC address "A", each relay switch can determine a port for forwarding from the result of the learning.

However, as shown in FIG. 1B, for example, if the L2 loop is generated due to an improper connection of a LAN cable at the relay switch SW3, a packet broadcasted in the subnet becomes a loop packet, and the packet is broadcasted in the subnet every time the broadcast packet is looped once.

This cycle is endlessly repeated until the loop packet is discarded for some reason, and the packet is endlessly broadcasted until the cause of the loop such as a cable loop is eliminated. Typically, broadcast packets such as an ARP (Address Resolution Protocol), RIP and NetBIOS are frequently transmitted to a subnet, and therefore, these packets are dominantly looped at the time of the L2 loop.

Especially, the ARP has a long packet length of about 64 bytes, and even the NetBIOS is a short packet having a packet length of about 200 bytes. When the L2 loop is generated, these packets are broadcasted in the entire subnet at a speed of transmission paths constituting the L2 loop. For example, if only ARP packets are looped in transmission paths of 100 Mbps, the packets are broadcasted in the entire subnet at a speed of a 140 thousand packets/sec which is a theoretical limitation value of the 100 Mbps Ethernet.

In this way, since reception of broadcast packets generates interrupting processing at end hosts and network devices on network, a high-load status of CPU utilization is generated especially in PCs or network devices executing software processing, and severe failures are generated, such as inability of operation.

Especially, a broadcast packet is often a packet requesting a response from a certain end host, such as an ARP request, and when a large amount of broadcast packets arrives at the end host which should respond, a higher-load status is further generated since a load of response processing is added.

SUMMARY OF THE INVENTION

It is therefore an object of the present invention to provide a communication control method and a communication system to which the same is applied, for preventing generation of a failure phenomenon by reducing the number of received broadcast packets per unit of time, which becomes a cause of a higher load at an end host associated with a L2 loop when the number of received packets is too large.

In order to achieve the above object, according to a first aspect of the present invention there is provided a communication control method in a communication system performing transmission/reception of data between end hosts connected to a relay switch in a subnet, for recovering a communication failure due to a packet loop generated by an improper connection at a L2 level in the relay switch, the method comprising continuously transmitting long-size MAC packets longer than a packet generating the packet loop into the subnet, which have destinations as a broadcast MAC address or multicast MAC address; and thereby stopping the packet loop.

In order to achieve the above object, according to a second aspect of the present invention there is provided a communication control method in a communication system performing transmission/reception of data between end hosts connected to a relay switch in a subnet, for recovering a communication failure due to a packet loop generated by an improper connection at a L2 level in the relay switch, the method comprising continuously transmitting long-size MAC packets longer than a packet generating the packet loop into the subnet, which have destinations as a unicast MAC address of a host not existing in the subnet; and thereby stopping the packet loop.

In order to achieve the above object, according to a third aspect of the present invention there is provided a communication control method in a communication system performing transmission/reception of data between end hosts connected to a relay switch in a subnet, for recovering a communication failure due to a packet loop generated by an improper connection at a L2 level in the relay switch, the method comprising continuously transmitting long-size MAC packets longer than a packet generating the packet loop into the subnet, which are set to a protocol not responded to by hosts in the subnet; and thereby stopping the packet loop.

The communication control method may comprise monitoring the number of the reception packets per unit of time; and continuously transmitting the long-size MAC packets until the monitored number of the reception packets becomes a predetermined value or less. The communication control method may comprise measuring a packet amount existing in the packet loop; and determining a packet amount of the continuously transmitted long-size MAC packets depending on the measured packet amount. The communication control method may comprise sending out the long-size MAC packets in accordance with controls from control means not belonging to the subnet.

In order to achieve the above object, according to a fourth aspect of the present invention there is provided a communication system performing transmission/reception of data between end hosts connected to a relay switch in a subnet, comprising a relay switch; end hosts, performing transmission/reception of data through the relay switch and constituting the subnet within the subnet; and a control apparatus, when a L2 loop is generated by an improper connection at a L2 level in the relay switch, continuously transmitting long-size MAC packets longer than a packet generating the L2 loop into the subnet, which have destinations as a broadcast MAC address or multicast MAC address.

Thus, the present invention can implement a communication control method and a communication system to which the same is applied, for preventing generation of a failure phenomenon by reducing the number of received broadcast packets per unit of time.

The features of the present invention will be more apparent from embodiments of the present invention which will be described hereinbelow with reference to the accompanying drawings.

DESCRIPTION OF THE PREFERRED EMBODIMENTS

Embodiments of the present invention will be described hereinbelow with reference to the drawings. The embodiments of the present invention are for the purpose of understanding the present invention and the technical scope of the present invention is not limited to these embodiments. The basic principle of the present invention will now be outlined.

Figure 2A:
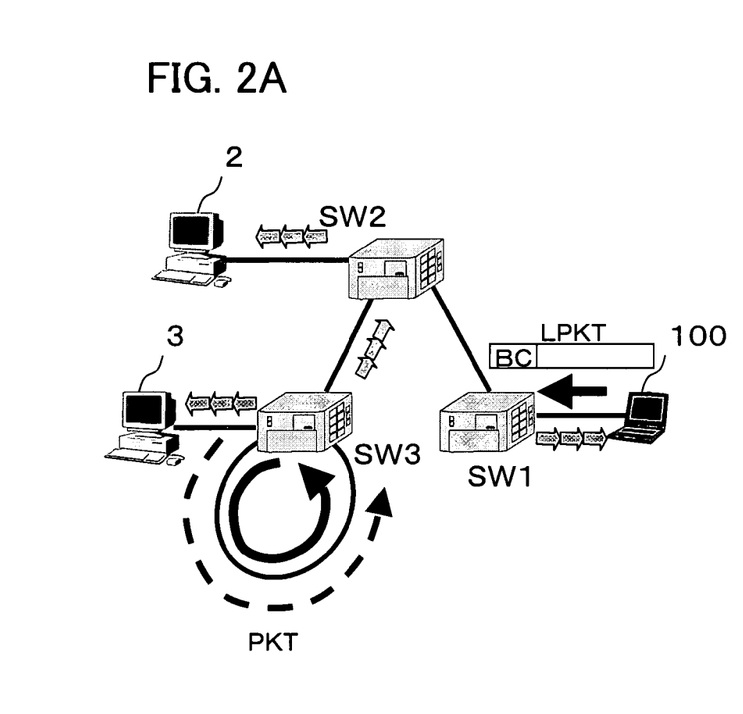
FIGS. 2A and 2B are diagrams for describing a resolution principle of the present invention.
Figure 2B:
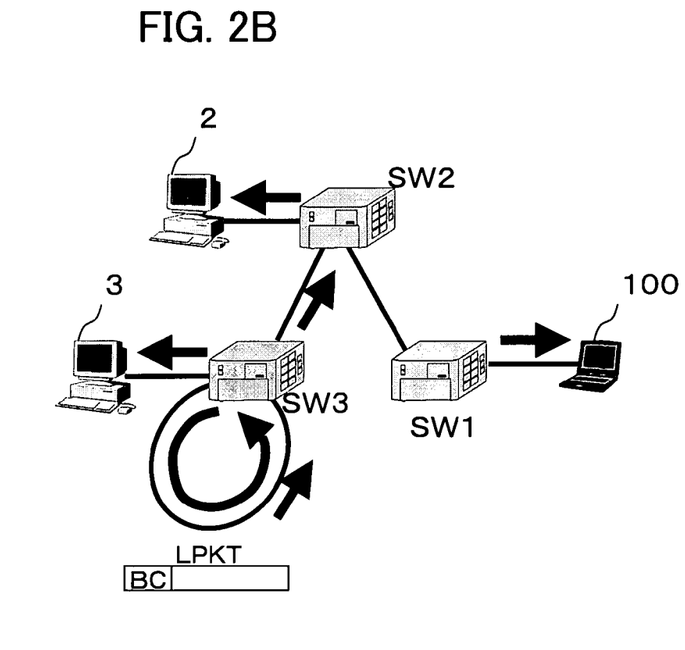

FIGS. 2A and 2B are diagrams for describing a resolution principle of the present invention. FIG. 2A shows a situation that a packet PKT broadcasted in a subnet becomes a loop packet since a L2 loop is generated at a relay switch SW3 and that the packet is broadcasted in the subnet. Because of this situation, an entire system is in a high-load status.

In the present invention, a communication control apparatus 100 according to the present invention (hereinafter, referred to as the inventive apparatus) is arranged to continuously transmit long packets LPKT with a long packet length such as 1,500 bytes.

In FIG. 2B, at a switch port of the relay switch SW3 constituting the loop, a 64-byte packet PKT (short packet) is input along with an input of a 1,500-byte long packet and these inputs are continuously generated.

Therefore, an input or output queue is overflowed, and as a result, the looped short packet PKT such as an ARP is discarded due to the queue overflow at the relay switch SW3.

For example, when 64-byte packets are looped, if the inventive apparatus 100 continuously transmits a large amount of 1,500-byte long packets LPKT, all the 64-byte packets can be discarded since a buffer overflow is generated at the relay switch SW3.

In this way, if the situation is changed over to a situation where only the 1,500-byte packets are looped, the broadcast packets in the subnet are 8,000 packets per second, and the number of received packets per unit of time is considerably reduced to about 1/20 of the case of the 64-byte packets. As a result, the failure phenomenon is recovered to the level that many end hosts or network devices can be operated.

First Embodiment

Figure 3:
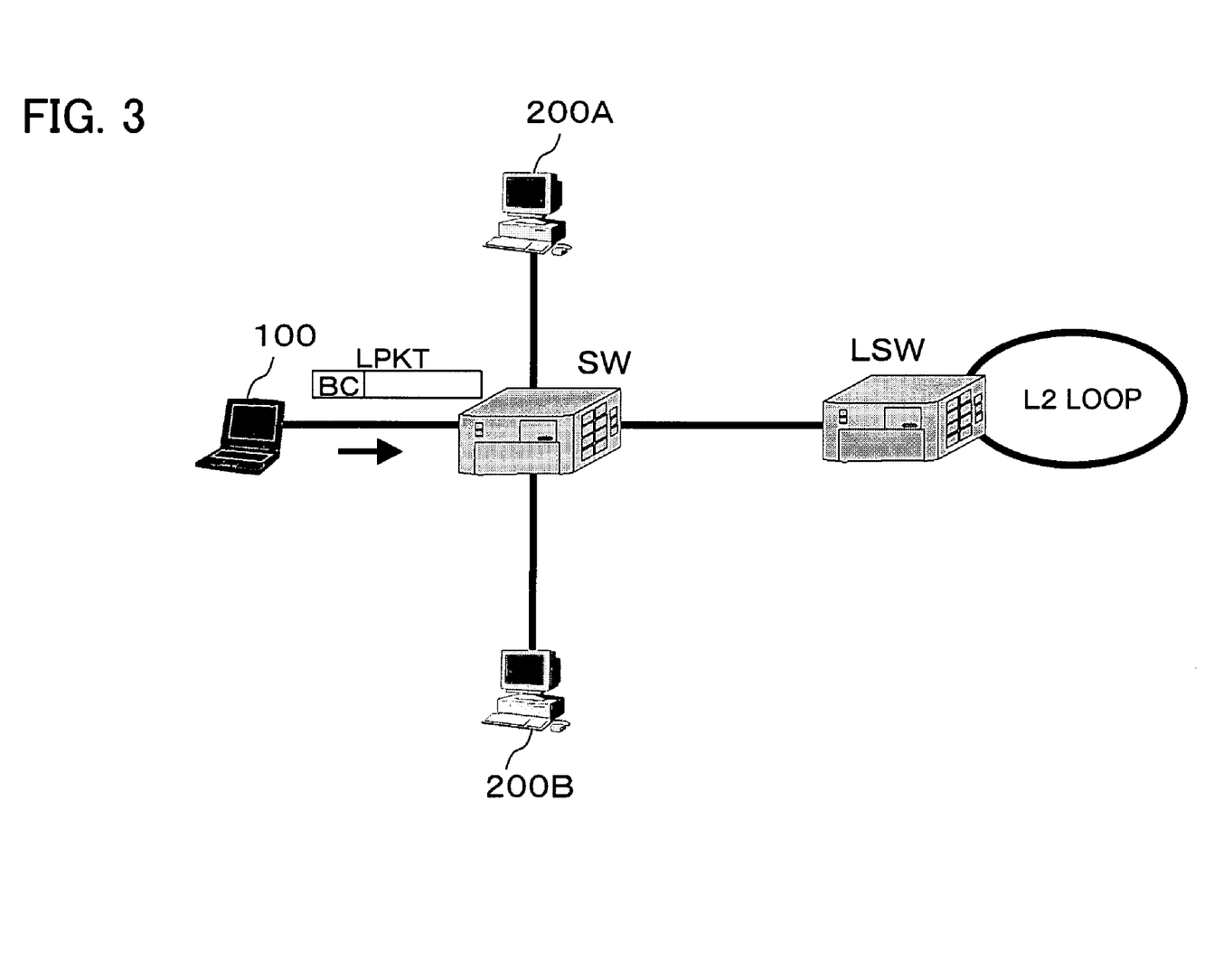
FIG. 3 is a diagram showing a configuration example of a subnet for describing the present invention.

FIG. 3 is a diagram showing a configuration example of a subnet for describing the present invention. A relay switch SW is connected to end hosts 200A, 200B, and a loop switch LSW is connected ahead of the relay switch SW. It is assumed that the L2 loop is generated in this loop switch LSW and that the network is in a high-load status due to the generation of the L2 loop.

Figure 4:
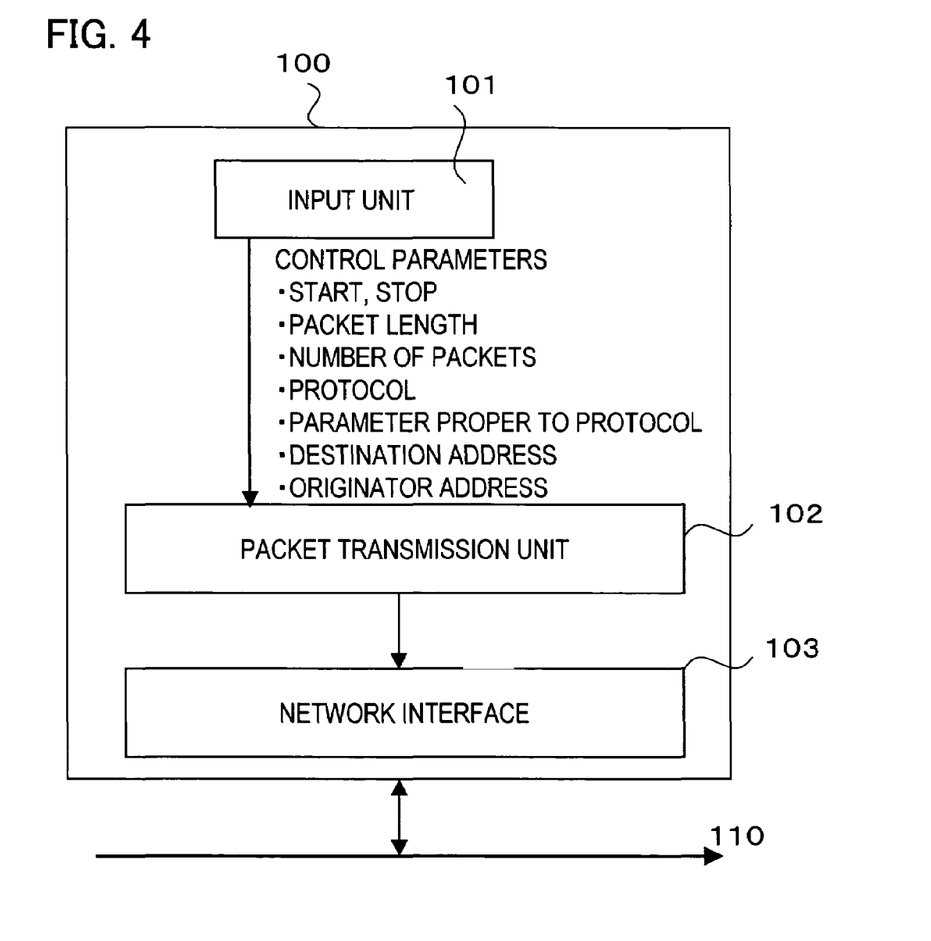
FIG. 4 is a functional block diagram of a structure example of the inventive apparatus 100.
Figure 5:
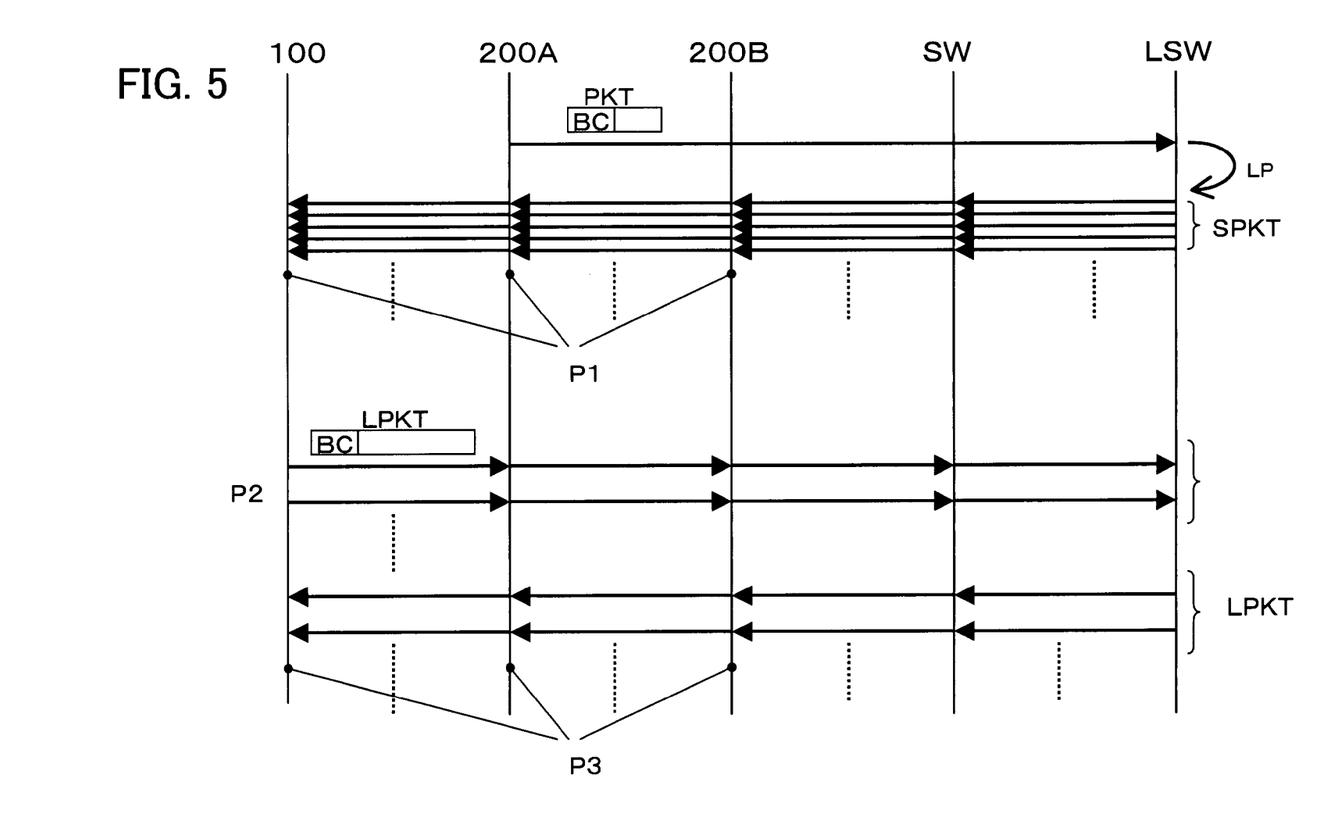
FIG. 5 is a sequence flow for describing the inventive embodiment.

In order to dissolve the failure status, the inventive apparatus 100 is connected to the relay switch SW, as one of the hosts. FIG. 4 is a functional block diagram of a structure example of the inventive apparatus 100. FIG. 5 is a sequence flow for describing the inventive embodiment.

In the sequence flow shown in FIG. 5, when the end host 200A performs broadcast transmission of the short packet PKT, each node will be in a high-load status because the L2 loop is generated due to an improper connection in the loop switch LSW (P1).

In order to dissolve this status, the inventive apparatus 100 is used. The inventive apparatus 100 has a function to transmit from a packet transmission unit 102 through a network interface 103 a packet consisting of a destination address of the Ether header, an outgoing address, a protocol, a payload depending on the protocol and the like, specified by an input unit 101, for a specified number of times.

As the specified packets, long-size broadcast packets LPKT are continuously transmitted (FIG. 5, P2). A basic operation is to reduce the load of the L2 loop already generated (FIG. 5, P3) in this way.

For describing a specific embodiment, in FIG. 4, the input unit 101 provides control parameters for the inventive apparatus 100 and the packet transmission unit 102 transmits and stops the packets in accordance with the input control parameters. For example, if the input unit 101 simply instructs start of transmission, 10,000 packets are transmitted as 1,514-byte Ethernet longest packets of a default parameter, which are ARP request frames in a MAC broadcast with a destination MAC address FF-FF-FF-FF-FF-FF, using an outgoing address as a MAC address of the inventive apparatus and an address requested by the ARP as an IP address of the inventive apparatus.

As control parameters, the packet transmission unit 102 is given a protocol, a destination MAC address, an outgoing MAC address, a packet length and a higher-level protocol specific parameter of the MAC packet. These all parameters of transmitted packets may be changed, may be default values or may be fixed values which cannot be changed.

When instructed to transmit, the packet transmission unit 102 generates packets based on the control parameter to transmit the packets to the network via the network interface 103. When instructed to stop, the packet transmission unit 102 stops the transmission of the packets.

The IP address requested by the ARP may be an IP address of other than the inventive apparatus, and for example, by utilizing an IP address which is not utilized in the subnet, since an end host with the relevant IP address does not have to respond to the ARP even if the ARP broadcast transmitted by the inventive apparatus 100 is looped, the effect of the loop can be consequently suppressed to a lower level at every end hosts.

As long as the end hosts does not respond to the packet, anything may be used other than the ARP, such as a protocol or a senseless packet which is not responded to by the end hosts actually existing in the subnet.

Also, other than the MAC broadcast, a MAC multicast address or a MAC unicast address not utilized in the subnet may be used as the destination MAC address of the transmitted MAC packet.

Especially, when a destination of a packet is the unicast MAC address not utilized in the subnet, although the packet is broadcasted in the loop switch LSW and is consequently looped, even if the packets are broadcasted and arrive at each end host 200A, 200B at high frequency, since the packet is different from a MAC address of any end host, the packet is not recognized as a packet transmitted for the end host and has higher effect of reducing loads of the end host 200A, 200B.

The outgoing address of the transmitted MAC packet may not be the MAC address of the inventive apparatus 100 and any address can be utilized. For example, the utilized outgoing address may be a MAC unicast address not utilized in the subnet, a MAC unicast address utilized in the subnet, a MAC broadcast and MAC multicast address.

Also, the transmitted protocol is not limited to the ARP and may utilize higher-level protocols such as IP, ICMP, IPX and the like, and any value may be used for the length and the number of the transmitted packets, as long as the packet reduces the effect of the short packet and can actually be transmitted on the network.

The inventive apparatus 100 may not be installed in the looping subnet and, for example, if the inventive apparatus 100 is installed in network different from the looping subnet, the same effect can be achieved by continuously transmitting 1,500-byte long-size ICMP Echo Requests and the like which have an IP broadcast address to the loop subnet as destinations, by continuously transmitting packets which are responded by a router in the loop subnet such as RIP responds with broadcast packets, or by continuously transmitting packets which are responded by the end host in the loop subnet such as NetBIOS responds with broadcast packets.

The inventive apparatus 100 may transmit a MAC packet with a VLAN tag and by specifying a VLAN tag utilized in the loop subnet, the packet can be transmitted to the appropriate subnet.

Second Embodiment

The first embodiment determines a transmitted packet and the number of the packet by the input, default or fixed parameters without depending on the situation of the network. Contrary to this, a second embodiment is characterized by that the transmitted packet and the number of the packet are determined depending on the situation of the network.

Figure 6:
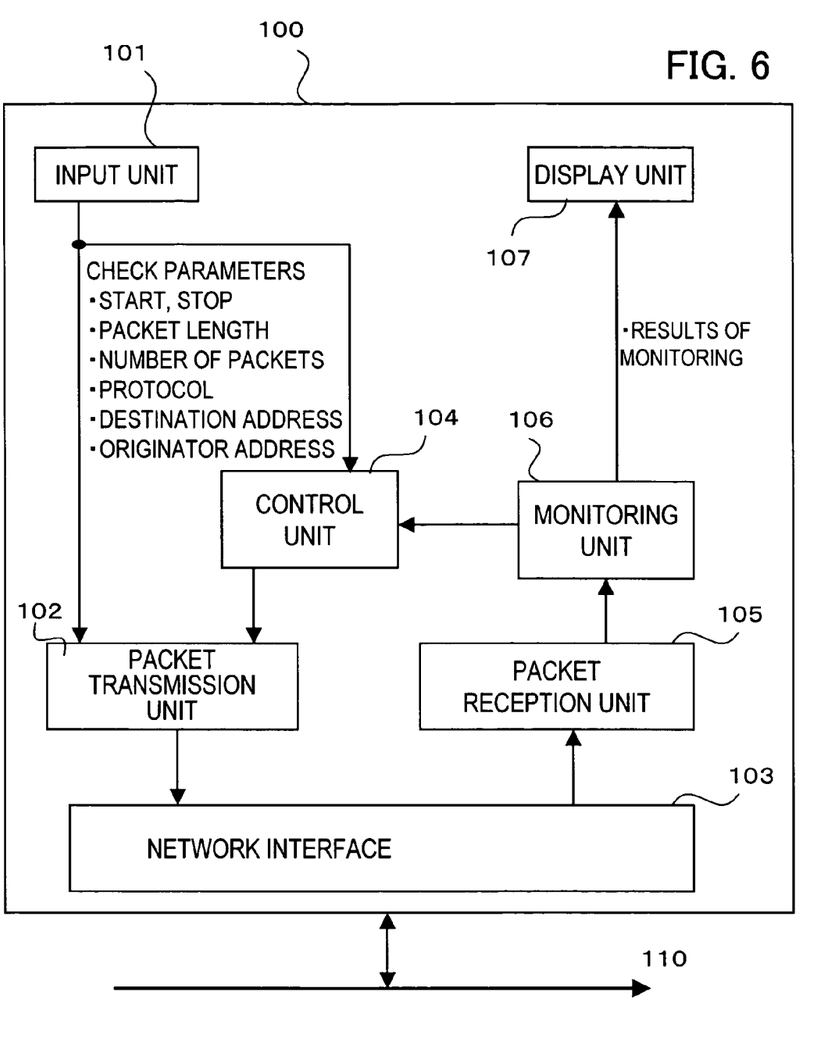
FIG. 6 is a diagram showing a configuration of an inventive apparatus 100 corresponding to the second embodiment, adding a function for receiving packets.

FIG. 6 is a diagram showing a configuration of an inventive apparatus 100 corresponding to the second embodiment, adding a function for receiving packets to the apparatus configuration (FIG. 4) of the inventive apparatus 100 shown in the first embodiment.

In FIG. 6, a packet reception unit 105 has such functions as receiving broadcast packets through a network interface 103, recording lengths of the received packets in a monitor unit 106, recording MAC addresses of end hosts existing in network, calculating a reception rate, or recording a cycle of the received packets. If necessary, the packet reception unit 105 can have a function for displaying these records and calculation results on a display unit 107 as results of monitoring.

Figure 7:
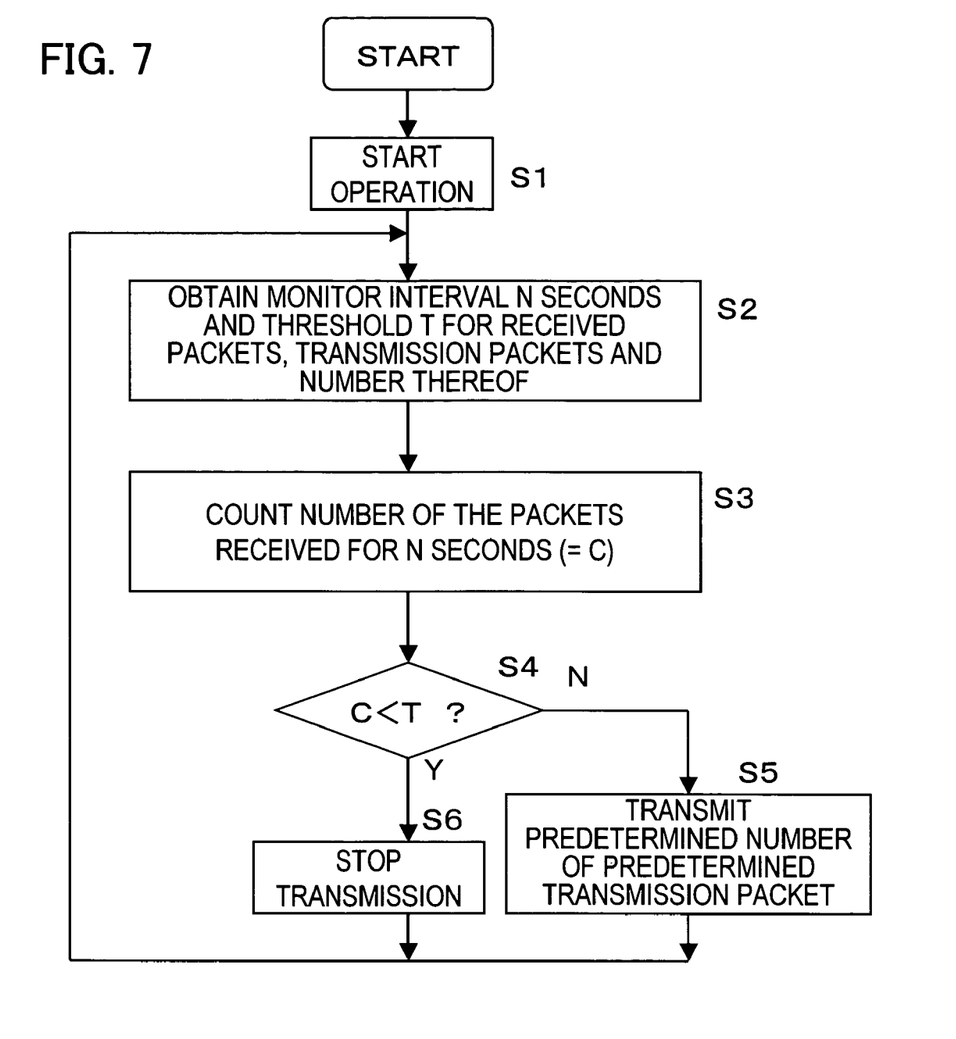
FIG. 7 is a process flow corresponding to the inventive apparatus 100 shown in FIG. 6.

FIG. 7 is a process flow corresponding to the inventive apparatus 100 shown in FIG. 6.

For example, when the operation is started (step S1), a monitor interval of N seconds and a threshold T for the received packets are obtained (step S2), which are specified by an input unit 101. Then, the number of the received broadcast packets is counted (step S3), which are received at the obtained monitor interval of N seconds (=5 seconds).

In this counting, only when the average number of the received packets is the set threshold (=10,000 packets per second) or more (step S4, N), a packet transmission unit 102 is instructed to transmit predetermined long packet LPKT for a few predetermined minutes (step S5). Otherwise (step S4, Y), the transmission is stopped (step S6).

In this way, in a situation where a short packet is not yet broadcasted, an advantage is obtained in that the long packets LPKT are prevented from being wastefully transmitted.

Although the looped packet changes momentarily depending on the broadcast packet transmitted by the end hosts, this function can attempt to discard a short packet if the short packet is looped.

The value of 10,000 packets per second and the parameter of counting the reception number for five (5) seconds are values instructed by the input unit 101 as control parameters to a control unit 104, and the values may be changed dynamically by the input unit 101 or may be set to the input unit or the control unit 104 as default or fixed parameters.

The flowchart of FIG. 7 shows a case that the monitoring is continued endlessly by giving the monitor interval N, the threshold T of the packet count, the transmitted packet and the number thereof. Of course, the monitoring may not be continued endlessly and may be performed only once, and in this case, when the transmission is stopped (step S6), the monitoring is not performed again and the monitoring operation itself can be configured to be terminated.

Third Embodiment

A third embodiment is characterized by having an advantage for preventing transmission of unwanted packets by controlling the number of transmitted long-size packets LPKT depending on a situation of the loop.

Figure 8:
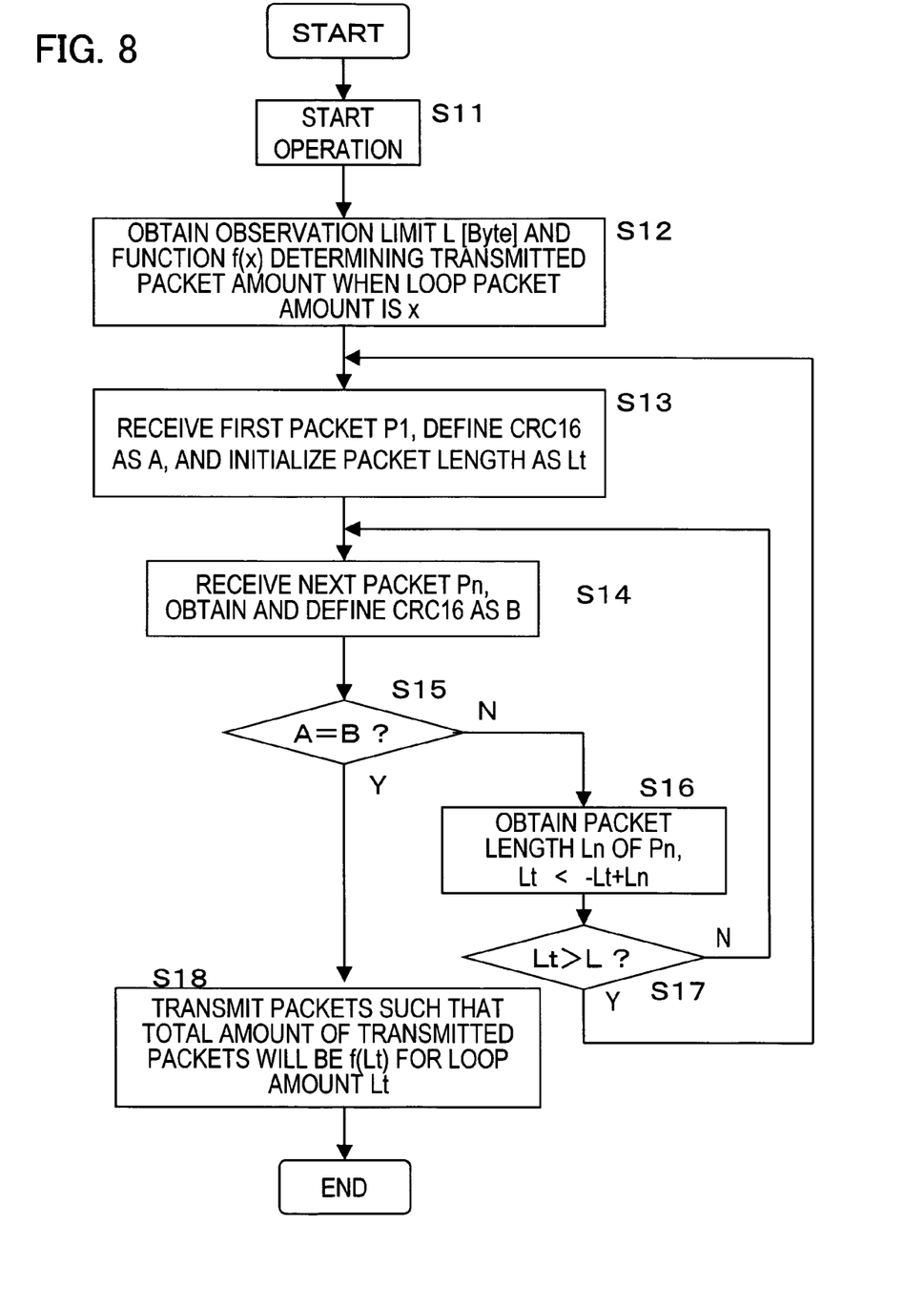
FIG. 8 is a process flow according to the third embodiment.
Figure 9:
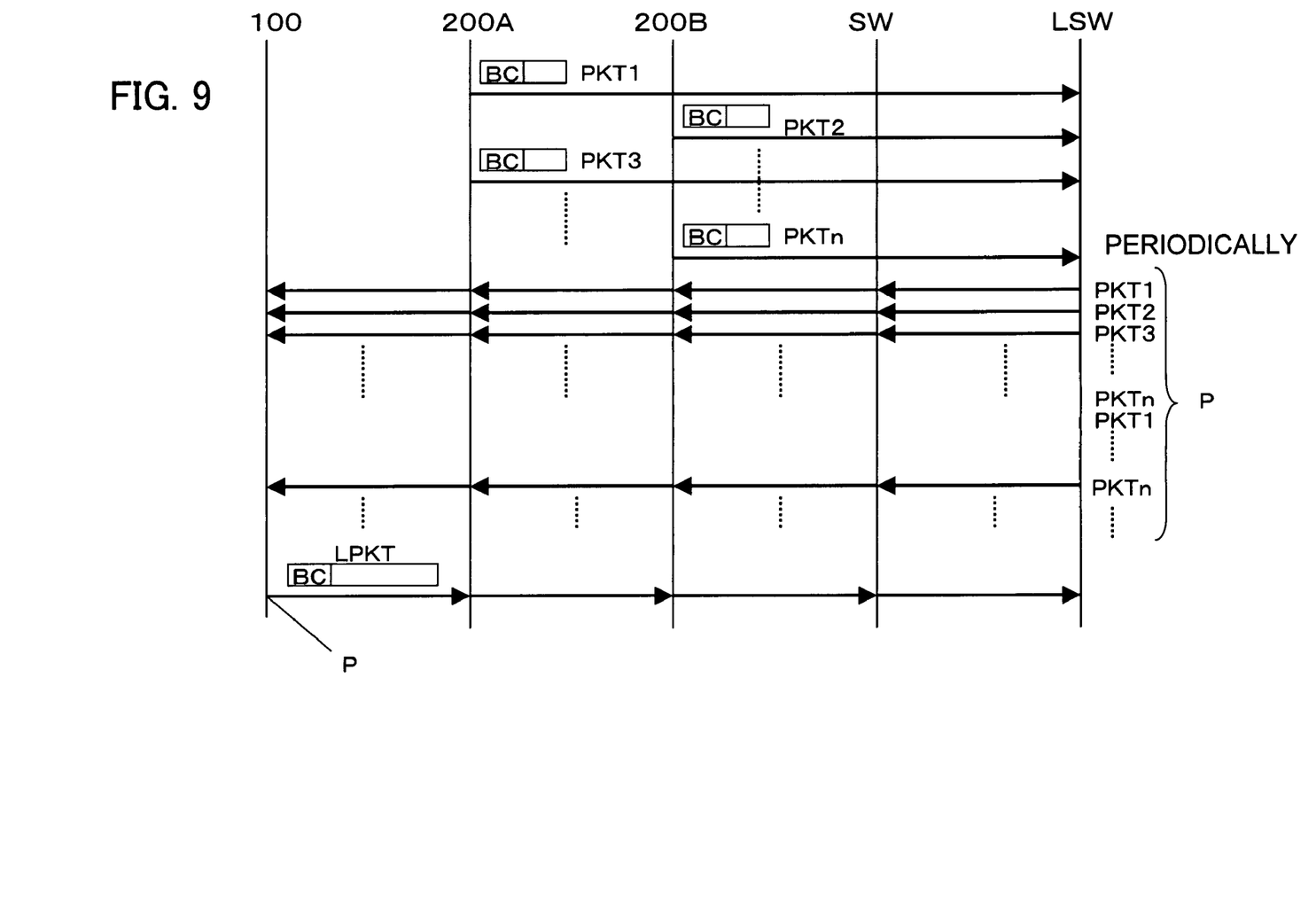
FIG. 9 is a sequence flow showing a flow of signals according to the third embodiment.

FIG. 8 is a process flow according to the third embodiment and FIG. 9 is a sequence flow showing a flow of signals. Typically, a plurality of packets is looped and the loop is sequentially started by broadcast packets PKT1, PKT2, ..., PKTn transmitted by hosts 200A, 200B. At this point, the maximum number of the looped packet is depending on the number of packets which can be held by the loop switch LSW, i.e., a queue length of the switch.

In the principle of flushing out short packets by transmitting long-size packets, the short packet LPKT is intentionally discarded by generating a queue overflow at the loop switch LSW, and therefore, when the queue length is short, the queue overflow is easily generated even if the number of the transmitted long packets LPKT is few, and the short packets PKT can be flushed out.

Contrary, when the queue length is long, a large amount of the long packets LPKT must be transmitted. The sequence flow of FIG. 9 shows an example of the situation where a plurality of packets are periodically generated and looped in this way (P in the figure).

In the process flow of FIG. 8, when the operation is started (step S11), the inventive apparatus 100 obtains an observation limit L [Byte] and a function f(x) determining a transmitted packet amount when a loop-back amount is x, which are set by the input unit 101 (step S12).

Then, one of broadcast packet PKTi is received for sampling; the monitor unit 106 calculates a cycle check symbol CRC 16; and the calculated cycle check symbol CRC 16 is defined as A; and a packet length is initialized as Lt to be stored (step S13).

CRC16 is calculated for each packet sequentially received and defined as B (step S14). A sum of packet lengths of received packets is obtained until the packet PKTi with the identical CRC16 value is found (i.e., A=B is established in step S15) (step S16, 17).

When the packet PKTi with the identical CRC16 value is found (step S15, Y), it is estimated that a packet amount existing in the loop is the sum of the packet lengths obtained in advance, and long packets LPKT are transmitted in a necessary and sufficient amount for discarding the entire packet amount, in other words, packets are transmitted such that the total amount of the transmitted packets will be f(Lt) for the loop Lt (step S18).

In this way, since the long packets LPKT are only transmitted in a necessary and sufficient amount for discarding the loop packets, unwanted large amount of packets can be prevented from being transmitted.

For example, if received broadcast packets have the total number of bytes of 100K bytes until the broadcast packet with the identical CRC is received, 670 1,500-byte packets are transmitted as packets having the total number of bytes of 1M bytes which is ten (10) times greater. By way of example, CRC16 is used here for determining the identity of the packets and a value is used for transmitting the packets having the total number of bytes ten (10) times greater than the total number of bytes of the looped packet in order to discard all the packets existing in the loop.

For the applicability of the present invention, this is nothing more than one embodiment, and the identify may be determined by comparing every bit of the packets if possible, or it may be determined that 100 times greater packets are transmitted if switches constituting the network has large-capacity buffers. These parameters may be given to the control unit 104 as control parameters from the input unit 101 or may be set to the control unit 104 or the input unit 101 as default or fixed parameters.

Fourth Embodiment

A fourth embodiment is characterized by monitoring whether a looped packet is a packet which may be responded by an end host actually existing in a subnet and by transmitting new long-size packets to prevent looping of a packet if the packet may be responded by the end host.

For example, an ARP request packet is typically a broadcast packet reaching to actually existing hosts to request responses, and if this packet is looped, the destination host must receive a large amount of requests and must transmit a large amount of responses. As a result, very high loads are generated in the destination hosts. Therefore, if an ARP request packet is looped, the currently looped ARP packet potentially having an adversely effect may be prevented from being looped by transmitting ARP request long packets to IP addresses outside of the same subnet or to IP addresses of hosts which dose not exist, or by continuously transmitting long packets which are not responded to by hosts existing in other protocols.

Figure 10:
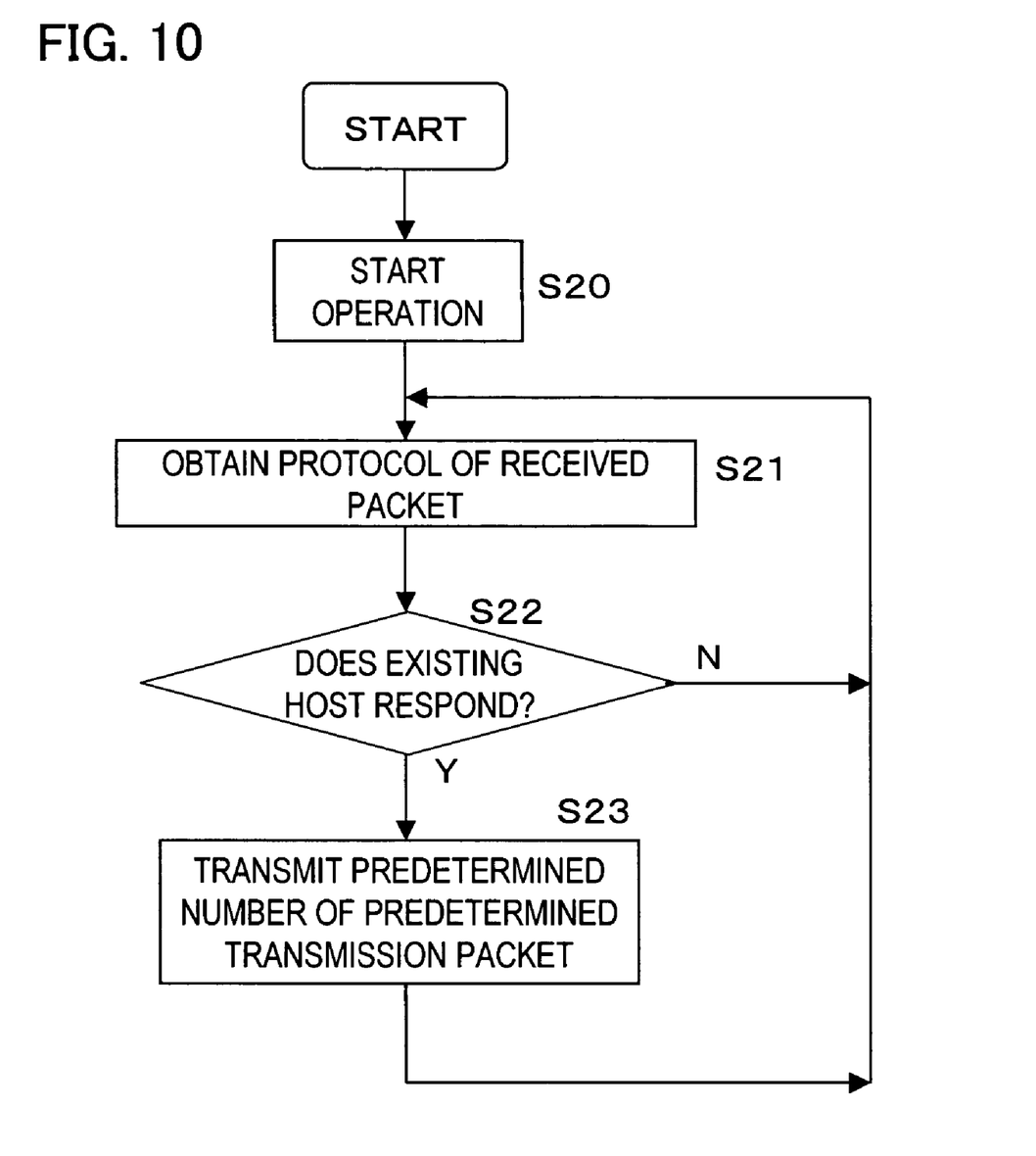
FIG. 10 is a process flow corresponding to the fourth embodiment.

In other words, FIG. 10 is a process flow corresponding to the fourth embodiment. When the operation is started (step S20), the monitor unit 106 obtains a protocol of a received packet (step S21). If it can be determined that the obtained protocol of the received packet is a packet which should reach to existing hosts, such as the ARP request packet (step S22, Y), predetermined transmission packets are transmitted in the predetermined number which is the number that the currently looped ARP packet potentially having an adversely effect can be prevented from being looped (step S23), and the predetermined transmission packets is not ARP packets and is long packets which is not responded to by hosts actually existing in other protocols. In this way, the packet can be prevented from being looped.

Fifth Embodiment

A fifth embodiment is an example of reducing a loop load remotely by controlling the inventive apparatus 100 existing inside or outside of a loop subnet remotely with a terminal belonging to a remote subnet different from the loop subnet to transmit long-size broadcast packets into the loop subnet.

Figure 11:
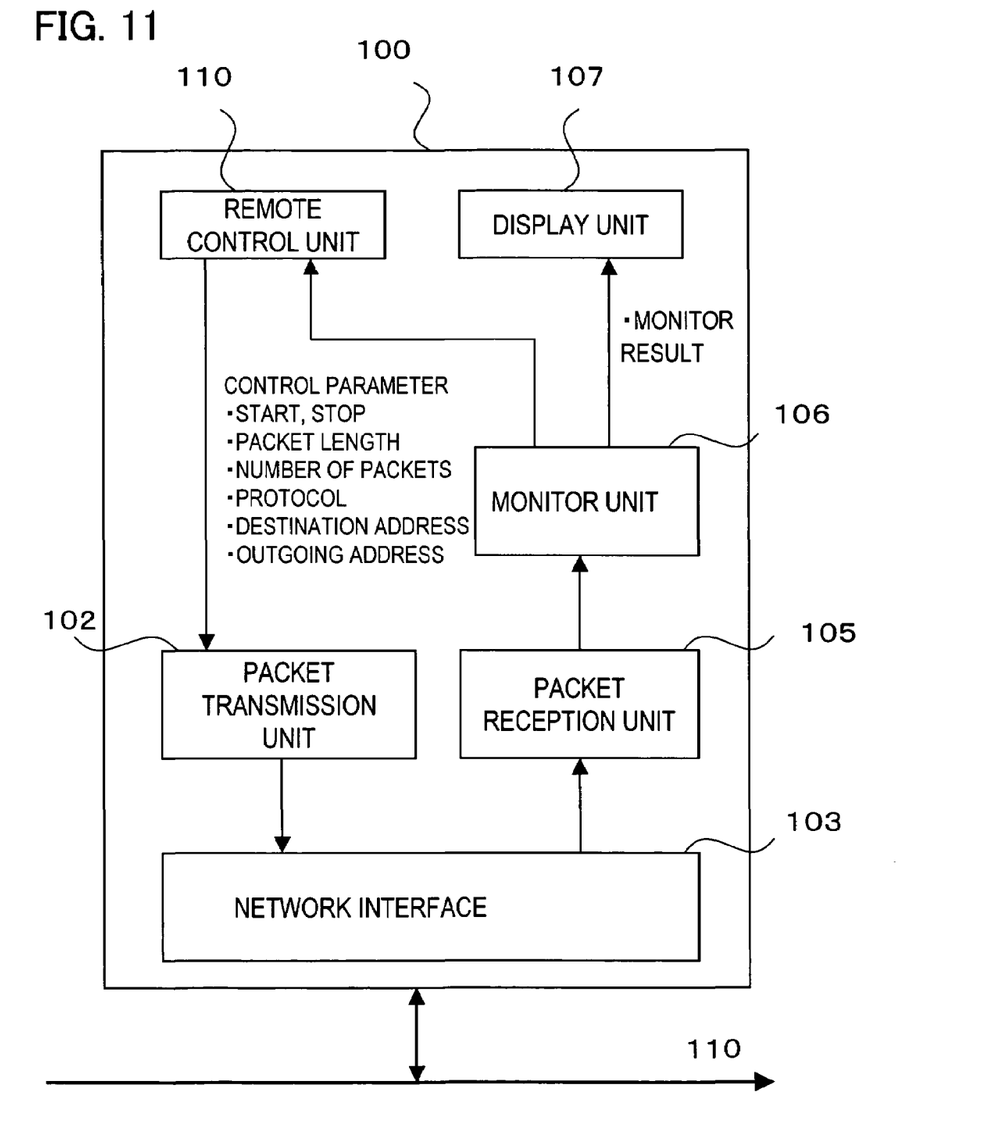
FIG. 11 is a diagram showing a functional structure of the inventive apparatus 100 corresponding to the embodiment.

FIG. 11 is a diagram showing a functional structure of the inventive apparatus 100 corresponding to the embodiment.

For example, a control message is transmitted via communication means such as telnet or SNMP by a terminal existing as an internal function of a router or an end host in a subnet remotely to the inventive apparatus 100 installed in a loop subnet in advance. The control message is received by a packet reception unit 105 of the inventive apparatus 100.

The inventive apparatus 100 interprets the control message as an input of control parameters in a remote control unit 110 and performs the same processing as the input unit 101 of the first to fourth embodiment described above.

In this way, the loop load can be reduced remotely without an operator bringing the inventive apparatus 100 into the site where the loop is generated.

The control message is not particularly limited in the case of existing communication means, and if TCP/IP is utilized, the control message may be carried by telnet, SNMP, or socket communications.

If the inventive apparatus 100 is operated as an end host connected to the loop subnet, as shown in FIG. 11, an interface transmitting/receiving the control messages and an interface transmitting the long-size broadcast packet are the same interface 103.

Alternatively, when the interfaces are physically different, a plurality of interfaces may exist if the interfaces are operated logically as single end host.

Also, the apparatus may be achieved as a portion of a logical function of a router (a gateway) at a boundary where the loop subnet is connected to external network, and in this case, although a network interface of FIG. 11 is divided in two to the subnet side and the external network side, as a logical function, packets to the router is received by the packet reception unit 105 once, and subsequent processing is not different.

Also, the inventive apparatus 100 may not be installed in the loop subnet, and as is the case with the first embodiment, the same advantage can be obtained by continuously transmitting to the loop subnet the ICMP Echo Request packets which have destinations set as IP broadcast from outside of the subnet into the loop subnet.

As seen in above descriptions of embodiments in accordance with the drawings, if a L2 loop broadcast loop is generated, the present invention can ensure a communication path between hosts in a loop subnet or between a host in the loop subnet and a host outside of the loop subnet to enable communications within a subnet. Therefore, the present invention can guarantee credibility of a communication quality and industrially makes a great contribution.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A communication control method in a communication system performing transmission/reception of data between end hosts connected to a relay switch in a subnet, for recovering a communication failure due to a packet loop generated by an improper connection at an L2 level in the relay switch, the method comprising:

monitoring a number of reception packets per unit of time;

continuously transmitting long-size MAC packets longer than a packet generating the packet loop into the subnet by a control apparatus that generates the long-size MAC packets and is connected to the communication system until the monitored number of the reception packets per unit of time becomes a predetermined value or less after at least one long-size MAC packet has been transmitted, the long-size MAC packets having destinations as a broadcast MAC address or multicast MAC address and, if the packet generating the packet loop has the longest size MAC packet possible in the system, the long-size MAC packets will have the longest size possible in the system; and overflowing an input or output queue and discarding the packet generating the packet loop by the relay switch receiving the long-size MAC packets because of the transmission of the long-size MAC packets.

2. The communication control method of claim 1, further comprising:

measuring a packet amount existing in the packet loop; and determining a packet amount of the continuously transmitted long-size MAC packets depending on the measured packet amount.

3. The communication control method of claim 2, further comprising:

sending out the long-size MAC packets in accordance with controls from control means not belonging to the subnet.

4. The communication control method of claim 1, further comprising:

sending out the long-size MAC packets in accordance with controls from control means not belonging to the subnet.

5. The communication control method of claim 1, further comprising:

sending out the long-size MAC packets in accordance with controls from control means not belonging to the subnet.

6. The communication control method of claim 1, wherein the monitoring is performed only once.

7. The communication control method of claim 1, wherein the monitoring is performed continuously.

8. A communication control method in a communication system performing transmission/reception of data between end hosts connected to a relay switch in a subnet, for recovering a communication failure due to a packet loop generated by an improper connection at an L2 level in the relay switch, the method comprising:

monitoring a number of reception packets per unit of time;

continuously transmitting long-size MAC packets longer than a packet generating the packet loop into the subnet by a control apparatus that generates the long-size MAC packets and is connected to the communication system until the monitored number of the reception packets per unit of time becomes a predetermined value or less after at least one long-size MAC packet has been transmitted, the long-size MAC packets having destinations as a unicast MAC address of a host not existing in the subnet and, if the packet generating the packet loop has the longest size MAC packet possible in the system, the long-size MAC packets will have the longest size possible in the system; and overflowing an input or output queue and discarding the packet generating the packet loop by the relay switch receiving the long-size MAC packets because of the transmission of the long-size MAC packets.

9. The communication control method of claim 8, further comprising:

measuring a packet amount existing in the packet loop; and determining a packet amount of the continuously transmitted long-size MAC packets depending on the measured packet amount.

10. The communication control method of claim 9, further comprising:

sending out the long-size MAC packets in accordance with controls from control means not belonging to the subnet.

11. The communication control method of claim 8, further comprising:

sending out the long-size MAC packets in accordance with controls from control means not belonging to the subnet.

12. The communication control method of claim 8, further comprising:

sending out the long-size MAC packets in accordance with controls from control means not belonging to the subnet.

13. A communication control method in a communication system performing transmission/reception of data between end hosts connected to a relay switch in a subnet, for recovering a communication failure due to a packet loop generated by an improper connection at an L2 level in the relay switch, the method comprising:

monitoring a number of reception packets per unit of time;

continuously transmitting long-size MAC packets longer than a packet generating the packet loop into the subnet by a control apparatus that generates the long-size MAC packets and is connected to the communication system until the monitored number of the reception packets per unit of time becomes a predetermined value or less after at least one long-size MAC packet has been transmitted, the long-size MAC packets having a protocol not responded to by hosts in the subnet and, if the packet generating the packet loop has the longest size MAC packet possible in the system, the long-size MAC packets will have the longest size possible in the system; and overflowing an input or output queue and discarding the packet generating the packet loop by the relay switch receiving the long-size MAC packets because of the transmission of the long-size MAC packets.

14. The communication control method of claim 13, further comprising:

measuring a packet amount existing in the packet loop; and determining a packet amount of the continuously transmitted long-size MAC packets depending on the measured packet amount.

15. The communication control method of claim 14, further comprising:

sending out the long-size MAC packets in accordance with controls from control means not belonging to the subnet.

16. The communication control method of claim 13, further comprising:

sending out the long-size MAC packets in accordance with controls from control means not belonging to the subnet.

17. The communication control method of claim 13, further comprising:

sending out the long-size MAC packets in accordance with controls from control means not belonging to the subnet.

18. A communication system performing transmission/reception of data between end hosts connected to a relay switch in a subnet, comprising:

a relay switch;

end hosts, performing transmission/reception of data through the relay switch and constituting the subnet within the subnet; and a control apparatus, when an L2 loop is generated by an improper connection at an L2 level in the relay switch, monitoring a number of reception packets per unit of time, generating long-size MAC packets and continuously transmitting long-size MAC packets longer than a packet generating the L2 loop into the subnet until the monitored number of the reception packets per unit of time becomes a predetermined value or less after at least one long-size MAC packet has been transmitted, the long-size MAC packets having destinations as a broadcast MAC address or multicast MAC address and, if the packet generating the packet loop has the longest size MAC packet possible in the system, the long-size MAC packets will have the longest size possible in the system, and overflowing an input or output queue and discarding the packet generating the packet loop by the relay switch receiving the long-size MAC packets because of the transmission of the long-size MAC packets.

* * * * *

UNITED STATES PATENT AND TRADEMARK OFFICE
CERTIFICATE OF CORRECTION

| | | |
|---|---|---|
| PATENT NO. | : 7,706,270 B2 | Page 1 of 1 |
| APPLICATION NO. | : 11/266176 | |
| DATED | : April 27, 2010 | |
| INVENTOR(S) | : Yuji Nomura et al. | |

It is certified that error appears in the above-identified patent and that said Letters Patent is hereby corrected as shown below:

Title Page, Column 1 Item [54] (Title), Line 6, change "SYSTEM TO WHICH THE SAME IS APPLIED" to --SYSTEM IN WHICH THE SAME IS APPLIED--.

Column 1, Line 6, change "SYSTEM TO WHICH THE SAME IS APPLIED" to --SYSTEM IN WHICH THE SAME IS APPLIED--.

Signed and Sealed this

Thirteenth Day of July, 2010

David J. Kappos
*Director of the United States Patent and Trademark Office*